United States Patent [19]

Urushibata

[11] Patent Number: 4,887,302
[45] Date of Patent: Dec. 12, 1989

[54] LABELLING CIRCUIT FOR IMAGE PROCESSOR

[75] Inventor: Yukio Urushibata, Tokyo, Japan

[73] Assignee: Kabushiki Kaisha Toshiba, Kawasaki, Japan

[21] Appl. No.: 67,245

[22] Filed: Jun. 29, 1987

[30] Foreign Application Priority Data

Jul. 2, 1986 [JP] Japan ................. 61-155704

[51] Int. Cl.[4] ............................. G06K 9/34
[52] U.S. Cl. ....................... 382/9; 382/26; 382/44
[58] Field of Search ............ 382/9, 26, 44, 22; 377/10, 11; 364/515, 516

[56] References Cited

U.S. PATENT DOCUMENTS

| | | | |
|---|---|---|---|
| 4,000,399 | 12/1976 | Kawahara | 377/10 |
| 4,069,411 | 1/1978 | Morton | 382/26 |
| 4,110,737 | 8/1978 | Fahey | 382/44 |
| 4,115,805 | 9/1978 | Morton | 377/10 |
| 4,183,013 | 1/1980 | Agrawala et al. | 382/9 |
| 4,550,434 | 10/1985 | Shimada et al. | 382/9 |
| 4,624,013 | 9/1986 | Urushibata | 382/9 |
| 4,718,101 | 1/1988 | Ariga et al. | 382/9 |

Primary Examiner—Leo H. Boudreau
Assistant Examiner—Joseph Mancuso
Attorney, Agent, or Firm—Cushman, Darby & Cushman

[57] ABSTRACT

The labelling circuit of this invention comprises first and second table memories, which designate when pixels assigned with different label values are of the same linked components and whose contents are updated based on linked information produced by a label extracting circuit. The labelling circuit further comprises first through third selectors. The first and second selectors select the label value of an intermediate processed image previously produced by the label extracting circuit, or one of label values of new linked information produced by the label extracting circuit, as an address for the first and second table memories. The third selector selects one of output data of the first and second table memories as output image data.

6 Claims, 7 Drawing Sheets

F I G. 1 (PRIOR ART)

F I G. 2 (PPIOR ART)

LABELLING CIRCUIT FOR IMAGE PROCESSOR

BACKGROUND OF THE INVENTION

This invention relates to a labelling circuit for checking a linking state of pixels having logic values of "1" and "0" stored in a two-dimensional image memory in an image processor, and sequentially assigning numbers (labels) to the pixels so as to generate an output image.

Figure 1:
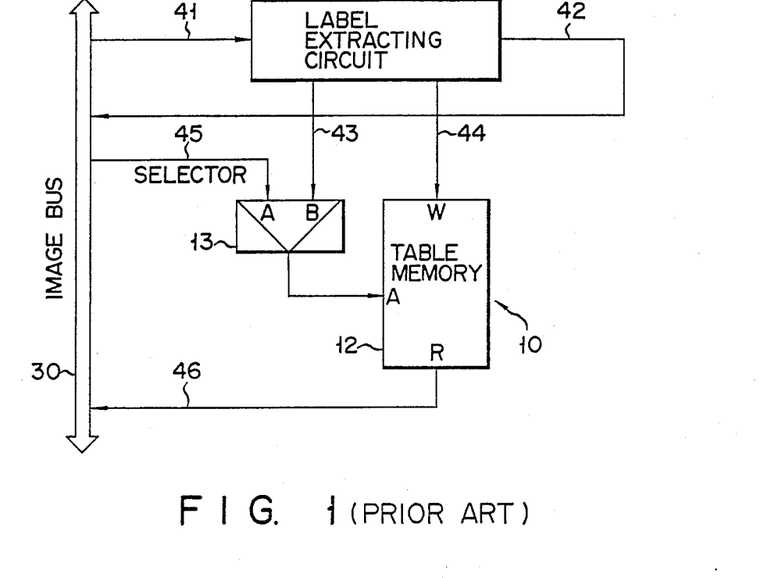
FIG. 1 is a block diagram of a conventional labelling circuit.
Figure 2:
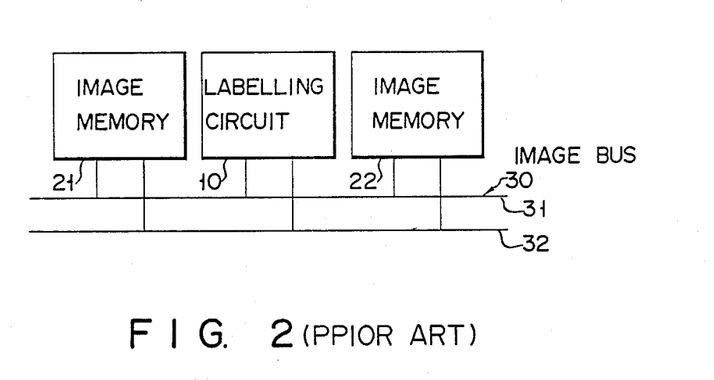
FIG. 2 is a block diagram showing an image processing apparatus provided with the labelling circuit of FIG. 1.
Figure 3A:
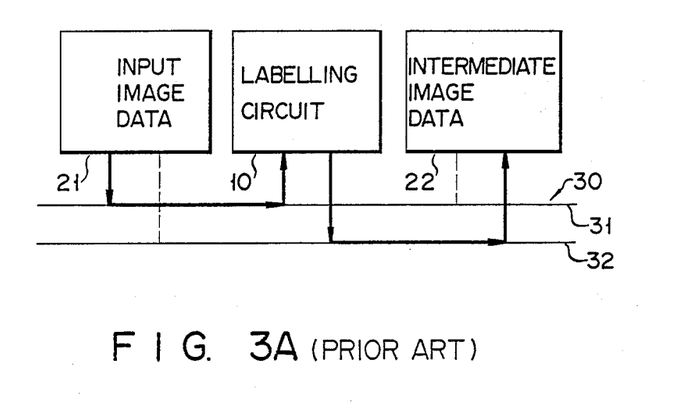
FIGS. 3A and 3B are diagrams illustrating step-by-step data flows in the image processing apparatus of FIG. 2.
Figure 3B:
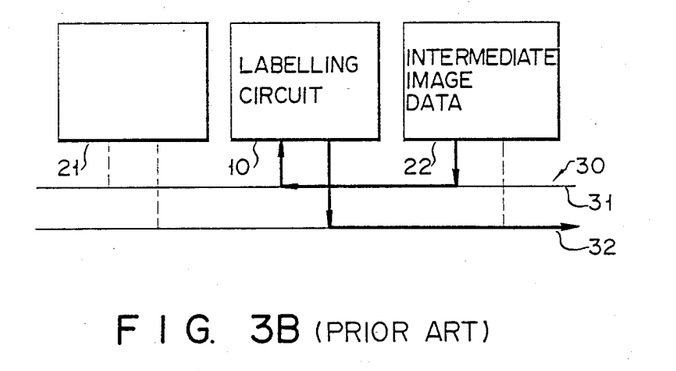
Figure 4A:
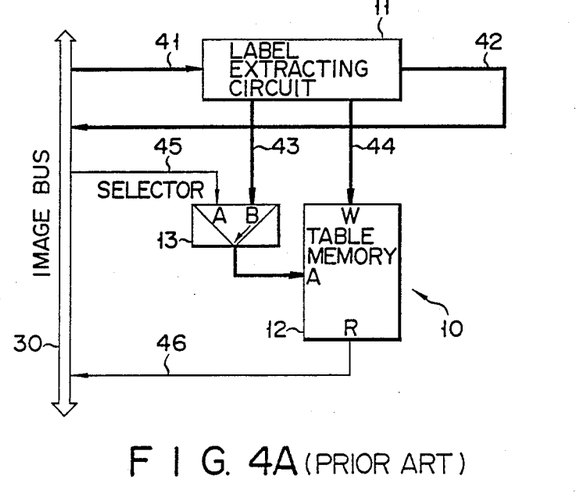
FIGS. 4A and 4B are diagrams illustrating step-by-step data flows in the labelling circuit of FIG. 1.
Figure 4B:
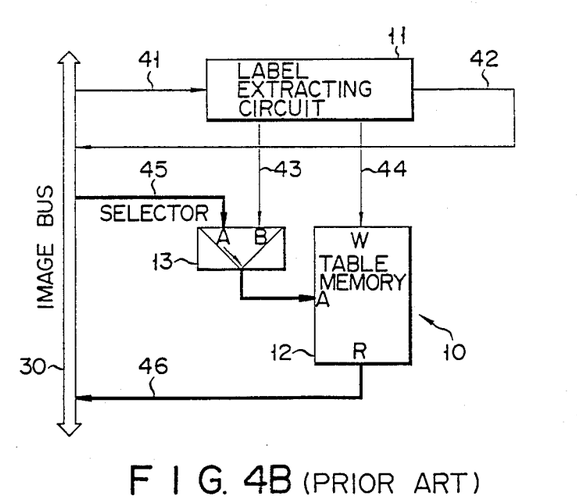

Labelling is known as one possible type of image processing, which checks the linking state of the individual pixels of an input image and assigns a specific number (label) to each independent figure. The labelling operation and the configuration of a labelling circuit performing it are disclosed in detail in USP 4,624,013 to the present inventor, entitled "Linked Component Extraction Circuit For Image Processor." FIG. 1 is a block diagram of such a prior art labelling circuit, and FIG. 2 is a block diagram illustrating an image processor provided with the labelling circuit of FIG. 1. In FIG. 2 an image memory 21 stores an input image which is to be subjected to labelling. This input image is transferred in units of pixels to a labelling circuit 10 via an image data bus 31 of an image bus 30.

Labelling circuit 10 has a label extracting circuit (linked component extracting circuit) 11, as shown in FIG. 1. Label extracting circuit 11 receives, through a line 41, the input image that is transferred from image memory 21 via image data bus 31, extracts linked components and then assigns labels to these linked components on the pixel-by-pixel basis. As a result, an intermediate processed image is generated. The intermediate prcessed image is transferred to an image memory 22 via a line 42 and an image data bus 32 for temporary storage.

The intermediate processed image stored in image memory 22 may contain pixel data of identical linked components, but assigned with different labels. In this case, data conversion is required in order to assign the same label to the pixels of the identical linked components. For this purpose, labelling circuit 10 is provided with a table memory 12 which designates when the pixels assigned with different labels are of the identical linked components. To correctly perform the designation, table memory 12 needs proper updating of its contents according to the state of an input image. Label extracting circuit 11 initiates the labelling operation and detects a pixel, which is of the same linked components as another pixel but is assigned with a different label than that of the latter pixel. Upon detection of such an incident, label extracting circuit 11 generates linked information consisting of the labels of those two pixels. One portion of the linked information is supplied to a B input of a selector 13 through a line 43, while the other portion is supplied to a write-data input port W of table memory 12 through a line 44. Consequently, the former portion of the linked information is selected by selector 13 and is supplied, as an address, to an address port A of table memory 12. As a result, the latter portion of the linked information is written into the memory location specified by the address. In this manner, linked information indicating that pixels labelled differently are of the identical linked components is written into table memory 12 in the labelling operation executed by label extracting circuit 11.

Assume now that labelling the entire input image is completed, the entire intermediate processed image is stored in image memory 22, and the contents of table memory 12 are updated in accordance with the input image. In this case, the intermediate processed image is transferred to labelling circuit 10 in units of pixels from image memory 22 and is supplied through a line 45 to an A input of selector 13. Selector 13 in turn selects this intermediate processed image and supplies it to table memory 12 as an address. Consequently, linked information (label value) is read out from the memory location of table memory 12 specified by the address. Accordingly, the intermediate processed image is properly labelled, and becomes a final processed image, which is supplied to a pixel calculation circuit, an image memory or the like (each not shown) through a line 46 and image bus 30.

The contents of table memory 12 of labelling circuit 10 are updated during the labelling operation by label extracting circuit 11. Therefore, it is impossible to perform the labelling operation of a new input image and the data conversion of the previously-generated intermediate processed image in parallel in labelling circuit 10. More specifically, according to the prior art, as shown in FIGS. 3A, 3B, 4A and 4B, a single labelling circuit 10 needs to alternately perform the labelling step (FIGS. 3A and 4A) for labelling an input image to generate an intermediate processed image and the data conversion step (FIGS. 3B and 4B) for subjecting this intermediate processed image to data conversion using table memory 12 to provide an output image (final processed image). This makes it impossible to perform a continuous labelling operation on various input images.

SUMMARY OF THE INVENTION

With the above situation in mind, it is an object of this invention to provide a labelling circuit which can perform a parallel operation of data conversion on an intermediate processed image and labelling of a new input image, and thus ensures a continuous labelling of various input images.

To achieve this object, the labelling circuit of this invention for an image processor in an image processing system, which has an input image memory for storing input pixel data of a figure, an image processor for processing pixel data read out from the input image memory and an output image memory for storing output pixel data from the image processor, comprises:

label extracting circuit for extracting linked components of the pixel data sequentially supplied from the input image memory, for labelling the extracted linked components in a predetermined order so as to provide an intermediate processed image, and for, when there exists pixel data which is of the same linked components as pixel data assigned with a first label value but is assigned with a second label value, generating linked information consisting of the first and second label values;

first and second table memories, which receive the first label value from the label extracting circuit as address data and the second label value from the label extracting circuit as write data;

first and second selectors, coupled to the label extracting circuit, for selecting a label value of the intermediate processed image previously generated by the label extracting circuit or the first label value of new linked information generated by the label extracting circuit, as the address data for the first and second table memories;

a third selector for selecting one of output images from the first and second table memories as output image data; and means for switching the first through third selectors every time new pixel data is supplied to the label extracting circuit.

DETAILED DESCRIPTION OF THE PREFERRED EMBODIMENTS

An embodiment of this invention will now be explained in conjunction with the accompanying drawings. For ease of understanding and simplicity, reference numerals used in FIG. 1 are also used for corresponding sections in FIG. 5, thus omitting a detailed explanation of those sections.

Figure 5:
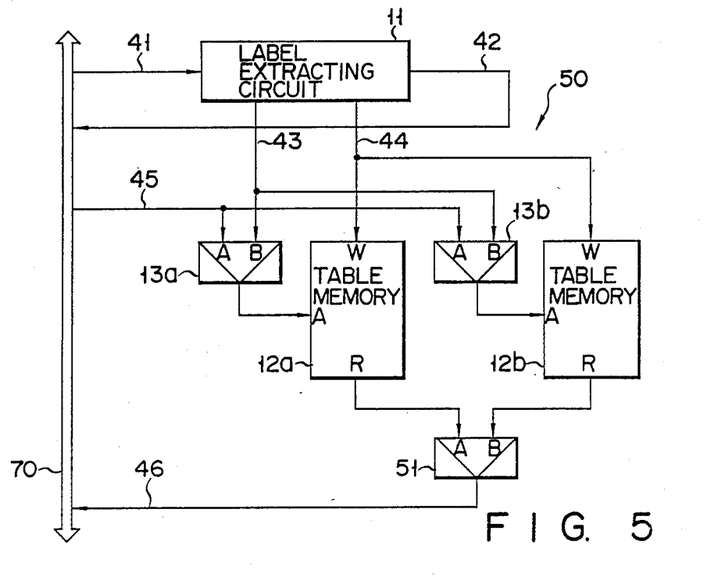
FIG. 5 is a block diagram depicting a labelling circuit according to an embodiment of this invention.
Figure 6:
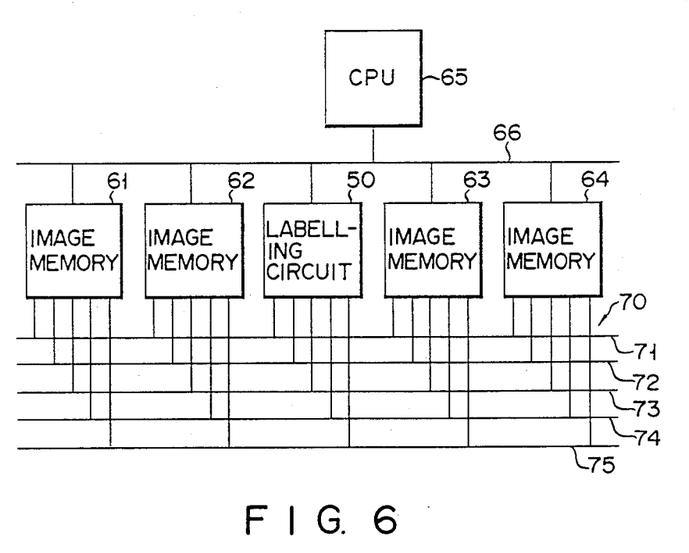
FIG. 6 is a block diagram of an image processing apparatus provided with the labelling circuit of FIG. 5.

FIG. 5 is a block diagram of a labelling circuit, and FIG. 6 is a block diagram of an image processing apparatus with the labelling circuit shown in FIG. 5. The image processing apparatus of FIG. 6 comprises a labelling circuit 50, image memories 61 through 64 and a CPU 65 for controlling the overall apparatus. Labelling circuit 50 and image memories 61-64 are coupled to CPU 65 through a control bus 66, and are coupled to one another through an image bus 70. This image bus 70 has image data bus 71 through 75 for image data transfer.

Table memories 12a and 12b of FIG. 5, which have the same configuration as table memory 12 of FIG. 1, designate when the pixels assigned with different labels have the identcal linked components. Like selector 13 of FIG. 1, selectors 13a and 13b each have two inputs and one output. Each of selectors 13a and 13b has its A input coupled to image bus 70 through line 45 and receives an intermediate processed image in units of pixels that has been generated in the preceding processing step by label extracting circuit 11. Selectors 13a and 13b have their B inputs coupled through line 43 to one output of label extracting circuit 11, and have their respective outputs coupled to address ports A of table memories 12a and 12b. Write-data input port W of each table memory 12a or 12b is coupled to the other output of label extracting circuit 11 through line 44. Readout-data output ports R of table memories 12a and 12b are respectively coupled to A and B inputs of a selector 51. Selector 51 has its output coupled through line 46 to image bus 70 to transfer an output image, which is the intermediate processed image subjected to data conversion, onto image bus 70.

The operation of this embodiment will now be explained with reference to FIGS. 7A through 7E and FIG. 8.

STEP 1:

An image is input by an ITV (industrial television) camera (not shown), and is then transferred in units of pixels to image memory 61 through an ITV camera interface and image data bus 71 and stored there. (See FIG. 7A.)

Figure 7A:
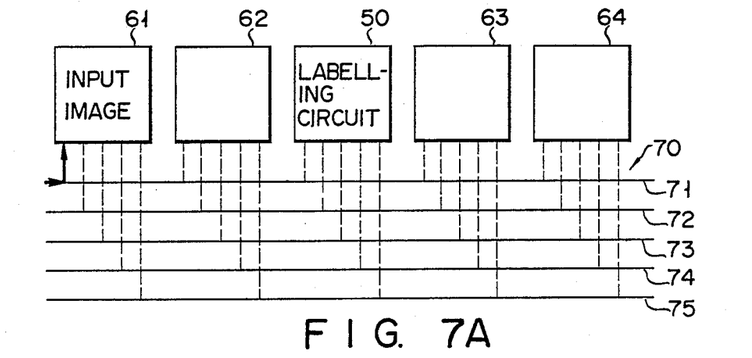
FIGS. 7A through 7E are diagrams showing step-by-step data flows in the image processing apparatus of FIG. 6.
Figure 7B:
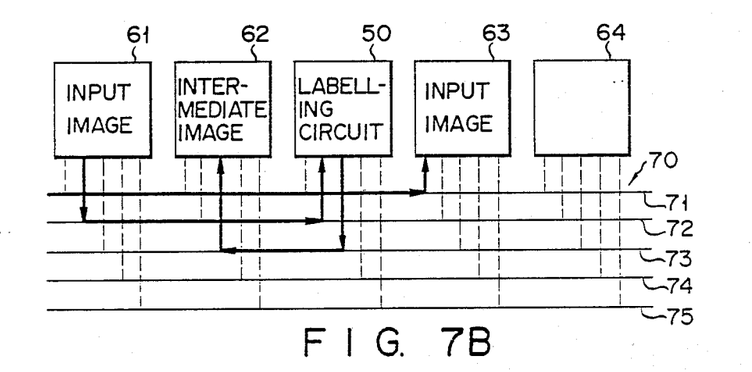

STEP 2:

The input image (the first input image) stored in image memory 61 in step 1 is read out in units of pixels, and is transferred to labelling circuit 50 through image bus 72 as shown in FIG. 7B. The first input image transferred to labelling circuit 50 is supplied to label extracting circuit 11 through line 41.

Upon reception of the first input image through line 41, label extracting circuit 11 extracts linked components and performs the labelling operation for each pixel to generate an intermediate processed image (the first intermediate processed image). The first intermediate processed image is transferred to image memory 62 through line 42 and image data bus 73 for temporary storage.

When label extracting circuit 11 detects in the labelling operation a pixel that has the same linked component as another labelled pixel but has a different label assigned, it generates linked information consisting of the labels of these two pixels and supplies the label value (the first link data) of the former pixel to the B inputs of selectors 13a and 13b through line 43 while supplying the label value (the second link data) of the latter pixel to write-data input ports W of table memories 12a and 12b through line 44. Selectors 13a and 13b are always switched to the opposite inputs alternately for each step, while selector 51 is switched to the same input as selector 13a. In an even numbered step, such as step 2, selectors 13a and 51 are switched to their respective B inputs, and selector 13b is switched to the A input. In step 2, therefore, selector 13a selects the first link data supplied from label extracting circuit 11 through line 43 and supplies the data to address port A of table memory 12a. At this time, when table memory 12a is set for the write mode, the linked information located in table memory 12a at the address specified by the first link data is replaced by the second link data supplied through line 44.

The next image (the second input image) is input by the ITV camera while the first input image is subjected to the labelling operation by labelling circuit 50. The second input image is stored in image memory 63 through image data bus 71, as shown in FIG. 7B.

Figure 7C:
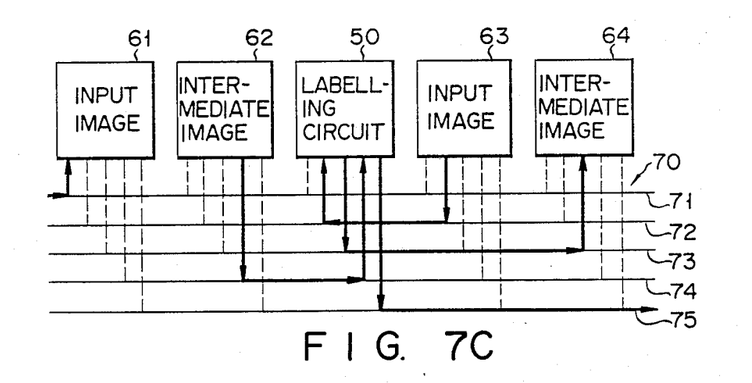
Figure 7D:
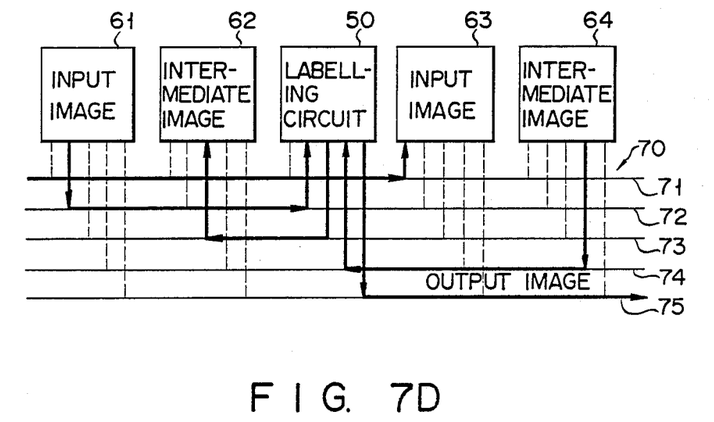
Figure 7E:
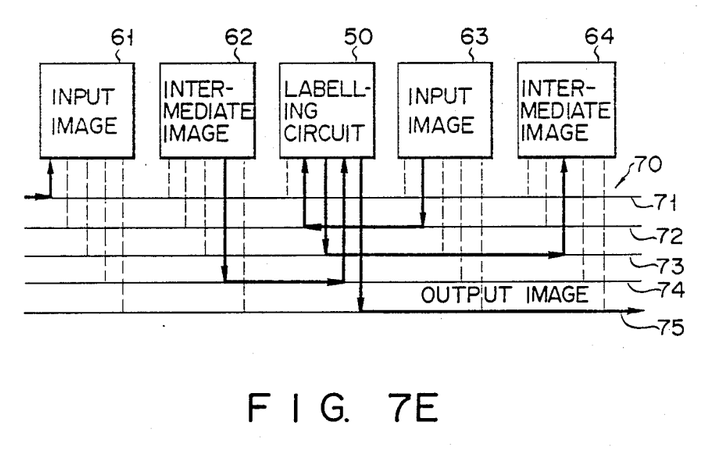

STEP 3:

In step 3 (odd numbered step), each of selectors 13a and 51 is switched to the A input, and selector 13b to the B input. The first intermediate processed image stored in image memory 62 in step 2 is transferred to labelling circuit 50 through image data bus 74 as shown in FIG. 7C. The first intermediate processed image transferred to labelling circuit 50 is supplied to the A inputs of selectors 13a and 13b. In step 3 in which selector 13a is switched to the A input, the first intermediate processed image supplied through line 45 is supplied by selector 13a to address port A of table memory 12a. At this time, when table memory 12a is set for the read mode, the linked information, which is located in table memory 12a at the address specified by the label value of one pixel of the intermediate processed image generated in step 2, is read out to the A input of selector 51 from readout-data output port R of table memory 12a. This linked information represents the result of the data conversion performed on the label value of one pixel of the intermediate processed image. Since selector 51 is switched to the A input in step 3, the data conversion result from table memory 12a is transferred to a pixel calculation circuit, an image memory or the like (each not shown) through line 46 and image data bus 75 (see FIG. 7C).

Then, the second input image is subjected to the labelling operation while the first intermediate processed image is subjected to the data conversion. In other words, the second input image stored in image memory 63 in step 2 is supplied through image data bus 72 to label extracting circuit 11 (see FIG. 7C) where the second input image is converted into a labelled intermediate processed image (the second intermediate processed image). This second intermediate processed image is transferred to image memory 64 for temporary storage through line 42 and image data bus 73 (see FIG. 7C). The first link data, which has been generated by label extracting circuit 11 in the step of preparing the first intermediate processed image, is supplied to the B inputs of selectors 13a and 13b through line 43. The second link data, which has also been generated by label extracting circuit 11, is supplied to write-data inputs ports W of table memories 12a and 12b through line 44. In step 3 in which selector 13b is switched to the B input, selector 13b selects the first link data supplied through line 43 and supplies the data to address port A of table memory 12b. At this time, when table memory 12b is set for the write mode, the linked information, which is located in table memory 12b at the address specified by the first link data, is replaced by the second link data.

Further, according to this embodiment, the next image (the third input image) is input by the ITV camera while labelling circuit 50 executes the data conversion on the first intermediate processed image and the labelling operation on the second input image. As shown in FIG. 7C, the third input image is stored in image memory 61 through image data bus 71 of image bus 70.

Figure 8:
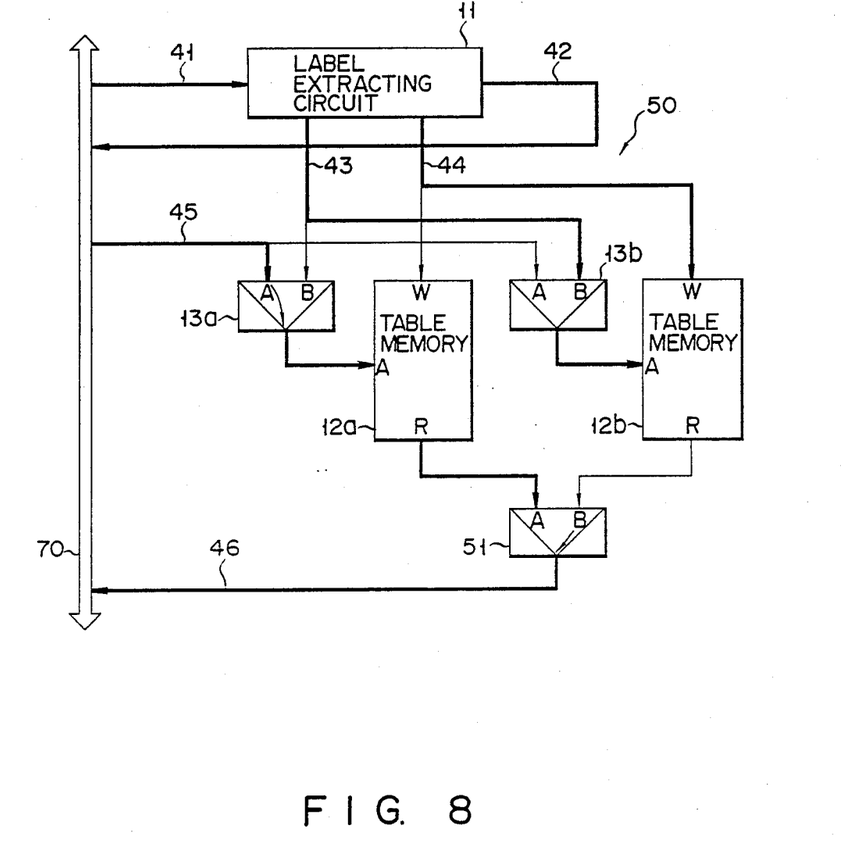
FIG. 8 is a diagram showing data flows in step 3 of the labelling circuit of FIG. 5.

FIG. 8 illustrates the data flows (in thick solid lines) within labelling circuit 50 in the above step (odd numbered step). In the next step 4 (see FIG. 7D), selectors 13a, 13b and 51 are switched to the inputs opposite to those selected in the previous step 3, unlike the case shown in FIG. 8, table memory 12b is used to carry out the data conversion of the second intermediate processed image supplied through line 45, and table memory 12a is subjected to the table updation based on the linked information output from label extracting circuit 11. In the next step 5 shown in FIG. 7E, however, the data flows within labelling circuit 50 are the same as those shown in FIG. 8.

What is claimed is:

1. An image processing apparatus for intrinsically labelling respective figures of input image data, comprising:
a first data bus;
first image memory means, coupled to the first data bus, for storing first input pixel data transferred through the first data bus;
second image memory means, coupled to the first data bus, for storing second input pixel data transferred through the first data bus;
a second data bus, connected to the first image memory means and to the second image memory means;
label extracting means for:
(1) extracting linked pixel components of one of the first or the second input pixel data transferred through the second data bus,
(2) labelling the extracted linked pixel components in a predetermined order,
(3) generating first intermediate processed image data corresponding to the first input pixel data or second intermediate processed image data corresponding to the second input pixel data, and
(4) outputting first label data assigned to a predetermined input pixel data and second label data, different from the first label data and assigned to input pixel data which is of the same linked pixel components as the predetermined input pixel data, when a second label data exists which is assigned to input pixel data which is of the same linked pixel components as the input pixel data asigned with the first label data;
a third data bus connected to the label extracting means;
first intermediate image memory means, coupled to the third data bus, for storing first intermediate processed image data transferred through the third data bus;
second intermediate image memory means, coupled to the third data bus, for storing second intermediate processed image data transferred through the third data bus;
fourth data bus means connected to the first and second intermediate image memory means;
first select means for selecting and outputting either the first intermediate processed image data transferred through the fourth data bus, or the first label data of the first intermediate processed image data output from the label extracting means;
second select means for selecting and outputting the first label data of the second intermediate processed image data output from the label extracting means when the first select means outputs the first intermediate processed image data, and for selecting and outputting the second intermediate processed image data transferred through the fourth data bus when the first select means outputs the first label data;
first table memory means for storing the second label data of the first intermediate processed data from the label data output means at an address designated by the first label data when the first select means outputs the first label data, the second label data stored at an address designated by the first intermediate processed image data being output from the first table memory means when the first select means outputs the first intermediate processed image data;
second table memory means for storing the second label data of the second intermediate processed image data from the label data output means in an address designated by the first label data when the second select means outputs the first label data, the second label data stored in the address designated by the second intermediate processed data being output from the second table memory means when the second select means outputs the second intermediate processed image data; and third select means for selecting and outputting the second label data output from the second table memory means when the generating means outputs the first intermediate processed image data on the third data bus, and for selecting and outputting the second label data output from the first table memory means when the generating means outputs the second intermediate processed image data on the third data bus.

2. An image processing apparatus according to claim 1, wherein the image processing apparatus further comprises means for executing in parallel the steps of:

(i) causing the label extracting means to (1) extract the linked pixel components of the first input pixel data, (2) generate the first intermediate processed image data, and (3) output a second label data when, during generation of the first intermediate processed image data, there exists pixel data which is assigned with the second label data but is of the same linked components as pixel data assigned with the first label data, and supplying the first label data as address data and the second label data as the write data to the first table memory means; and (ii) storing new input pixel data into the second image memory means.

3. An image processing apparatus according to claim 2, wherein the image processing apparatus further comprises means for executing in parallel the steps of:

(i) causing the first table memory means to output the linked information at an address specified by the first label data of the first intermediate processed image data stored in the first intermediate image memory means, and supplying the output linked information to the third selector means as a result of data conversion performed on the first intermediate processed image data;

(ii) causing the label extracting means to (1) extract the linked pixel components of the second input pixel data, (2) generate the second intermediate processed image data, and (3) output a second label data when, during generation of the second intermediate processed image data, there exists pixel data which is assigned with the second label data but is of the same linked components as pixel data assigned with the first label data, and supplying the first label data as address data and the second label data as the write data to the second table memory means; and (iii) storing new image data into the first image memory means.

4. An image processing apparatus for intrinsically labelling respective figures of input image data, comprising:

a first data bus;

first image memory means, connected to the first data bus, for storing first input pixel data transferred through the first data bus;

second image memory means, connected to the first data bus, for storing second input pixel data transferred through the first data bus;

a second data bus connected to the first image memory means and the second image memory means;

a label extracting circuit, connected to the second data bus, for receiving the first input pixel data stored in the first image memory means or the second input pixel data stored in the second image memory means through the second data bus, for extracting linked components of the first or the second input pixel data, for labelling the extracted linked components in a predetermined order to generate a first intermediate processed image data corresponding to the first input pixel data or second intermediate processed image data corresponding to the second input pixel data, and for generating linked information of the first and second label data when input pixel data exists which is of the same linked components as pixel data assigned with a first label data but is assigned with a second label data;

a third data bus connected to the label extracting circuit;

a first intermediate image memory, connected to the third data bus, for storing the first intermediate processed image data transferred through the third data bus from the label extracting circuit;

a second intermediate image memory, connected to the third data bus, for storing the second intermediate processed image data transferred through the third data bus from the label extracting circuit;

a fourth data bus connected to the first and second intermediate image memories;

a first selector, connected to the fourth data bus, for receiving the first intermediate processed image data transferred through the fourth data bus from the first intermediate image memory, and the first label data of the first intermediate processed image data from the label extracting circuit, and for selecting and outputting one of the first intermediate processed image data from the first intermediate image memory and the label data from the label extracting circuit;

a second selector, connected to the fourth data bus, for receiving the second intermediate processed image data transferred through the fourth data bus from the second intermediate image memory and the first label data of the second intermediate processed image data output from the label extracting circuit, for selecting and outputting the first label data output from the label extracting circuit when the first selector selects and outputs the first intermediate processed image data from the first intermediate image memory, and for selecting and outputting the second intermediate processed image data from the second intermediate image memory when the first selector selects and outputs the first label data from the label extracting circuit;

a first table memory for receiving the first intermediate processed data from the first intermediate image memory output from the first selector or a first label data of the first input pixel data from the label extracting circuit as a first address data, for receiving the second label data of the first input pixel data as a first write data, for storing the first write data in an address designated by the first address data when receiving the first label data as the first address data, and for outputting a first write data stored in an address designated by the first address data when receiving a first intermediate processed image data from the first intermediate image memory;

a second table memory for receiving the second intermediate processed image data from the second intermediate image memory output from the second selector and a first label data of the second input pixel data from the label extracting circuit as a second address data, for receiving the second label data of the second input pixel data output from the label extracting circuit as a second write data, for storing the second write data in an address designated by the second address data when receiving the first label data as the second address data, or for outputting the second write data stored in an address designated by the second address data when receiving the second intemediate processed image data from the second intermediate image memory as the second address data; and a third selector for receiving an output from the first table memory and an output from the second table memory, for selecting and outputting an output of the second table memory when the label extracting circuit outputs the first intermediate processed image data on the third data bus, and for selecting and outputting an output of the first table memory when the label extracting circuit outputs the second intermediate processed image data on the third data bus.

5. An image processing apparatus according to claim 4, wherein the label extracting circuit includes means for executing in parallel the steps of:
(i) causing the label extracting circuit to label first pixel data supplied from the first image memory means so as to generate a first intermediate processed image, storing the first intermediate processed image into the first intermediate image memory, causing the label extracting circuit to generate linked information comprising first and second label data when, during generation of the first intermediate processed image, there exists pixel data which is assigned with the second label data but is of the same linked components as pixel data assigned with the first label data, and supplying the first label data as address data and the second label data as the write data to the first table memory; and
(ii) storing new image data into the second image memory.

6. An image processing apparatus according to claim 5, wherein the label extracting circuit includes means for executing in parallel the steps of;
(i) causing the label extracting circuit to read out linked information, stored in the first table memory at an address specified by the first label data of the intermediate processed image stored in the first intermediate image memory, and supplying the read linked information to the third selector as a result of data conversion performed on the intermediate processed image;
(ii) causing the label extracting circuit to label new input pixel data supplied from the second input image memory to generate the second intermediate processed image and to generate linked information comprising first and second label data when, during generation of the second intermediate processed image, there exists pixel data which is assigned with the second label data but is of the same linked components as pixel data assigned with the first label data, and supplying the first label data as address data and the second label data as the write data to the second table memory; and
(iii) storing new image data into the first image memory means.

* * * * *